(12) United States Patent
Brown et al.

(10) Patent No.: US 6,218,484 B1
(45) Date of Patent: Apr. 17, 2001

(54) FLUIDIZED BED REACTOR AND POLYMERIZATION PROCESS

(75) Inventors: Robert Cecil Brown, Danbury; Norman Louis Balmer, Ridgefield, both of CT (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/240,037

(22) Filed: Jan. 29, 1999

(51) Int. Cl.$^7$ .................... C08F 2/34; B01J 8/18
(52) U.S. Cl. ............... 526/68; 526/70; 526/88; 526/901; 526/920; 422/132; 422/135; 422/138; 422/140; 422/146
(58) Field of Search ............... 526/68, 70, 901; 422/132, 135, 138, 140, 146

(56) References Cited

U.S. PATENT DOCUMENTS

| | | | |
|---|---|---|---|
| 3,625,932 | 12/1971 | Green | 260/92.8 |
| 3,779,712 | 12/1973 | Calveri et al. | 23/288 |
| 4,390,669 | 6/1983 | Morita et al. | 526/65 |
| 4,621,952 | 11/1986 | Aronson | 406/138 |
| 5,453,471 | 9/1995 | Bernier et al. | 526/68 |
| 5,541,270 | 6/1996 | Chinh et al. | 526/68 |

FOREIGN PATENT DOCUMENTS

| | | |
|---|---|---|
| 0089691 A1 | 9/1983 | (EP) . |
| 1415442 | 8/1967 | (GB) . |
| 1398965 | 6/1975 | (GB) . |

*Primary Examiner*—David W. Wu
*Assistant Examiner*—R. Rabago
(74) *Attorney, Agent, or Firm*—N. L. Balmer; R. C. Brown (57) ABSTRACT

A continuous process for the manufacture of olefin polymers in a continuous gas phase polymerization reaction wherein monomer, after passage through the fluidized bed, is cooled to a temperature below its dew point to produce a mixture of cold gas and liquid. All or part of the cold gas is introduced into the bottom of the reactor to serve as the fluidizing gas stream for the fluidized bed. Cold liquid separated from the mixture is warmed to form a heated fluid by passing in indirect heat exchange relation with the fluidized bed and the heated fluid is then injected directly into the bed; combined with the fluidizing gas stream; sprayed on top of the bed or combined with gaseous monomer removed from the fluidized bed for cooling.

43 Claims, 4 Drawing Sheets

FLUIDIZED BED REACTOR AND POLYMERIZATION PROCESS

FIELD OF THE INVENTION

The present invention relates to a continuous process for the gas-phase polymerization of monomers in a fluidized bed or in a stirred bed reactor, and in particular to a process having improved levels of productivity.

Gas phase processes for the homopolymerization and copolymerization of monomers, especially olefin monomers are well known in the art. Such processes can be conducted for example by introducing the gaseous monomer into a stirred and/or fluidized bed comprising pre-formed resin particles and a catalyst for the polymerization.

In the gas fluidized bed polymerization of olefins, the polymerization is conducted in a fluidized bed reactor wherein a bed of polymer particles are maintained in a fluidized state by means of an ascending gas stream comprising the gaseous reaction monomer. The polymerization of olefins in a stirred bed reactor differs from polymerization in a gas fluidized bed reactor by the action of a mechanical stirrer within the reaction zone which contributes to fluidization of the bed. The start-up of such a polymerization process generally employs a bed of pre-formed polymer particles similar to the polymer which it is desired to manufacture. During the course of polymerization, fresh polymer is generated by the catalytic polymerization of the monomer, and polymer product is withdrawn to maintain the bed at more or less constant volume. An industrially favored process employs a fluidization grid to distribute the fluidizing gas to the bed, and also to act as a support for the bed when the supply of gas is cut off. The polymer produced is generally withdrawn from the reactor via a discharge conduit arranged in the lower portion of the reactor, near the fluidization grid. The fluidized bed comprises a bed of growing polymer particles, polymer product particles and catalyst particles. This reaction mixture is maintained in a fluidized condition by the continuous upward flow from the base of the reactor of a fluidizing gas which comprises recycle gas drawn from the top of the reactor, together with added make-up monomer.

The fluidizing gas enters the bottom of the reactor and is passed, preferably through a fluidization grid, upwardly through the fluidized bed.

The polymerization of olefins is an exothermic reaction and it is therefore necessary to provide means for cooling the bed to remove the heat of polymerization. In the absence of such cooling the bed would increase in temperature until, for example, the catalyst became inactive or the bed commenced to fuse.

In the fluidized bed polymerization of olefins, the preferred method for removing the heat of polymerization, is by passing a cooling gas, preferably the fluidizing gas, which is at a temperature lower than the desired polymerization temperature, through the fluidized bed to conduct away the heat of polymerization. The gas is removed from the reactor, cooled by passage through an external heat exchanger and then recycled to the bed.

The temperature of the recycle gas can be adjusted in the heat exchanger to maintain the fluidized bed at the desired polymerization temperature. In this method of polymerizing alpha olefins, the recycle gas generally comprises one or more monomeric olefins, optionally together with, for example, an inert diluent gas or a gaseous chain transfer agent such as hydrogen. The recycle gas thus serves to supply monomer to the bed to fluidize the bed and to maintain the bed within a desired temperature range. Monomers consumed by conversion into polymer in the course of the polymerization reaction are normally replaced by adding make-up monomer to the recycle gas stream.

It is well known that the production rate (i.e. the space time yield in terms of weight of polymer produced per unit volume of reactor space per unit of time) in commercial gas fluidized bed reactors of the afore-mentioned type is limited by the maximum rate at which heat can be removed from the reactor. The rate of heat removal can be increased for example, by increasing the velocity of the recycle gas and/or reducing the temperature of the recycle gas. However, there is a limit to the velocity of the recycle gas which can be used. Above this limit the bed can become unstable or even lift out of the reactor in the gas stream, leading to blockage of the recycle line and damage to the recycle gas compressor or blower. Even at velocities safely below this level, it is important to keep the velocity of the exiting gases safely below the level at which excessive amounts of polymer fines are carried out of the top of the reactor. There is also a practical limit on the extent to which the recycle gas can be cooled. This is primarily determined by economic considerations and is normally determined by the temperature of the industrial cooling water available on site. Refrigeration can be employed if desired, but this adds to the production costs. Thus, in commercial practice, the use of cooled recycle gas as the sole means of removing the heat of polymerization from the gas fluidized bed polymerization of olefins has the disadvantage of limiting the maximum production rates obtainable.

BACKGROUND OF THE INVENTION

The prior art discloses a number of methods for removing heat from gas fluidized bed polymerization processes.

GB 1415442 relates to the gas phase polymerization of vinyl chloride in a stirred or fluidized bed reactor, the polymerization being carried out in the presence of at least one gaseous diluent having a boiling point below that of vinyl chloride. Example 1 of this reference describes the control of the temperature of polymerization by the intermittent addition of liquid vinyl chloride to fluidized polyvinyl chloride material. The liquid vinyl chloride evaporates immediately in the bed, resulting in the removal of the heat of polymerization.

U.S. Pat. No. 3,625,932 describes a process for polymerization of vinyl chloride wherein beds of polyvinyl chloride particles within a multiple stage fluidized bed reactor are kept fluidized by the introduction of gaseous vinyl chloride monomer at the bottom of the reactor. Cooling of each of the beds to remove heat of polymerization generated therein is provided by spraying liquid vinyl chloride monomer into the ascending gas stream beneath the trays on which the beds are fluidized.

GB 1398965 discloses the fluidized bed polymerization of ethylenically unsaturated monomers, especially vinyl chloride, wherein thermal control of the polymerization is effected by injecting liquid monomer into the bed using one or more spray nozzles situated at a height between 0% and 75% of that of the fluidized material in the reactor.

U.S. Pat. No. 4,390,669 relates to homo- or copolymerization of olefins by a multi-step gas phase process which can be carried out in stirred bed reactors, fluidized bed reactors, stirred fluidized bed reactors or tubular reactors. In this process polymer obtained from a first polymerization zone is suspended in an intermediate zone in an easily volatilized liquid hydrocarbon. The suspension, so obtained, is fed to a second polymerization zone where the liquid hydrocarbon evaporates. In Examples 1 to 5, gas from the second polymerization zone is conveyed through a cooler (heat exchanger) wherein some of the liquid hydrocarbon condenses (with comonomer if this is employed). The volatile liquid condensate is partly sent in the liquid state to the polymerization vessel where it is vaporized and serves to remove some the heat of polymerization. This reference is ambiguous as to how or where the liquid is introduced into the polymerization vessel.

EP 89691 relates to a process for increasing the space time yield in continuous gas fluidized bed processes for the polymerization of fluid monomers, the process comprising cooling part or all of the unreacted fluids to form a two phase mixture of gas and entrained liquid below the dew point and reintroducing said two phase mixture into the reactor. This technique is referred to as operation in the "condensing mode". EP 89691 also discloses that it is possible to form a two-phase fluid stream within the reactor at the point of injection by separately injecting gas and liquid under conditions which will produce a two phase stream.

U.S. Pat. No. 5,541,270 claims that by cooling the recycle gas stream to a temperature sufficient to form a liquid and a gas and by separating the liquid from the gas and then feeding the liquid directly to the fluidized bed, the total amount of liquid which may be reintroduced into the fluidized bed polymerization reactor for the purpose of cooling the bed by evaporation of the liquid, can be increased thereby increasing the level of cooling and thereby to achieve higher levels of productivity.

BRIEF SUMMARY OF THE INVENTION

It has now been found that a much higher level of cooling can be achieved than has hitherto been thought possible through the use of a condensing mode of operation and even more cooling than is claimed to be possible in the disclosure of U.S. Pat. No. 5,541,270, described above. In addition, through the use of this invention, a higher level of cooling can be achieved without the risk of flooding or wet quenching of the fluidized bed. The risk of internal reactor fouling by sheeting, agglomeration or by other causes is also reduced by the practice of this invention.

Thus according to the present invention there is provided a continuous gas-phase fluidized bed process for the polymerization of monomers, especially olefin monomers, such as ethylene, propylene, butene, mixtures of ethylene and propylene and mixtures of such monomers with one or more other alpha-olefins, such as hexene-1, octene-1 or 4-methylpentene-1, for example, in a fluidized bed reactor. This invention is also useful in other polymerization processes, such as the process described in U.S. Pat. No. 5,453,471.

The objectives of this invention are achieved by continuously recycling a gaseous stream comprising at least some monomer, such as ethylene and/or propylene, through a fluidized bed in a gas fluidized bed or stirred bed reactor in the presence of a polymerization catalyst under reactive conditions. At least a portion of the gaseous stream is withdrawn from reactor and cooled to a temperature at which liquid condenses out. At least a part of the condensed liquid is separated from the gaseous stream and introduced into the reactor after first having been passed in indirect heat exchange relation to the fluidized bed, for example by passing through a plurality of conduits such as metal conduits which have good heat exchange properties and which are in heat exchange contact with at least a portion of the exterior wall of the reactor. In the course of this passage, the condensed liquid is warmed by the heat of polymerization transferred through the wall of the reactor. This warming of the condensed liquid monomer may result in the conversion of some or all of it into gaseous monomer. After having passed through the said conduits, the monomer (now best characterized as a "heated fluid") in its all liquid, all gas or mixed gas and liquid state, is introduced into the reactor to effect further cooling of the fluidized bed. The point of introduction of the heated fluid can be in the lower regions of the reactor, preferably below the fluidization grid or directly into the fluidized bed, at any level thereof.

If the condensed liquid monomer should be converted into gas or essentially all gas after such passage it may also be condensed again in either a separate heat exchanger before introduction into the reactor or returned to again pass through a heat exchanger employed to cool the primary cycle gas stream.

The use of such indirect cooling of the fluidized bed permits the recycle gas stream to be cooled to a lower temperature than might otherwise be possible, thereby producing a larger quantity of condensed liquid and also cooling the non-condensed gaseous monomer stream to a lower temperature level as well. An advantage of this invention is that this higher level of cooling is possible without increasing the amount of condensed liquid monomer passing into the reactor. The process according to this invention can be conducted in such a way as too maintain the fluidized bed in a totally dry condition or with only a small amount of liquid entering the bed, simply by properly regulating the amount and temperature of liquid passing in heat exchange contact with the reactor wall.

A secondary advantage of this invention results from the localized cooling of the reactor wall because polymer particles have a reduced tendency to adhere to these colder reactor walls.

While the invention and its advantages are described below in relation to a process conducted in a gas fluidized bed reactor, the invention is equally useful and advantageous when practiced in a stirred bed reactor.

DETAILED DESCRIPTION OF THE INVENTION

The process according to the present invention is suitable for the manufacture of polyolefins in the gas phase by the polymerization of one or more olefins at least one of which is preferably ethylene or propylene. Preferred alpha-olefins for use in mixtures with ethylene in the practice of the process of the present invention are those having from 3 to 8 carbon atoms. However, small quantities of alpha olefins having more than 8 carbon atoms, for example olefinic monomers having 9 to 18 carbon atoms, such as ethylidene norbornene can be employed if desired. Thus it is possible to produce homopolymers of both ethylene and propylene as well as copolymers of both ethylene and propylene with one or more higher alpha olefin monomers of which $C_3$–$C_8$ alpha olefins are preferred. Among the preferred higher alpha-olefins are butene-1, pentene-1, hexene-1, 4-methylpentene-1, octene-1 and butadiene. Examples of higher olefins that can be copolymerized with the primary ethylene or propylene monomer, or as partial replacement for the $C_3$–$C_8$ monomer are decene-1 and ethylidene norbornene.

When the process is used for the copolymerization of ethylene or propylene with alpha-olefins, ethylene or propylene is present as the major component of the copolymer, and preferably is present in an amount which is at least 70% of the total quantity of monomer entering the fluidized bed.

The process according to the present invention may be used to prepare a wide variety of polymer products, such as linear low density polyethylene (LLDPE) based on copolymers of ethylene with butene-1, 4-methylpentene-1 or hexene-1. The process can also be used to produce high density polyethylene (HDPE) which can be for example, homopolyethylene or copolymers of ethylene with a small portion of a higher alpha olefin, such as butene-1, pentene-1, hexene-1, 4-methylpentene-1 or octene-1.

The liquid which condenses out of the recycle gaseous stream can be a condensable monomer, e.g. butene, hexene, or octene when used as a comonomer for the production of LLDPE or it may be an inert condensable liquid, e.g. butane, pentane, or hexane.

It is desirable that nearly all of any free liquid entering bed should vaporize within the bed under the polymerization conditions being employed so that the maximum cooling effect is obtained while avoiding any substantial accumulation of liquid within the bed. Preferably, except when producing polymers by the process disclosed in U.S. Pat. No. 5,453,471, all of the liquid entering the bed evaporates therein. In the case of liquid comonomers, some of the comonomer polymerizes in the bed, and such polymerization takes place with reactants which are either in the liquid or the gas phase. As is well known in conventional gas phase polymerization and copolymerization processes, a small proportion of the monomer (and comonomer, if any is used) tends to remain associated (absorbed or dissolved) in the product polymer until the polymer has been removed from the reactor and is subjected to degassing. Such associated quantities and even higher quantities of absorbed or dissolved monomers and comonomers can readily be tolerated within the bed provided that these quantities do not adversely affect the fluidization characteristics of the bed. An advantage of this invention resides in the ability to achieve a high level of cooling with less risk of flooding the reactor. This is because indirect liquid cooling through the reactor wall in accordance with the invention results in less, or no liquid at all, entering the reactor to achieve a given level of cooling.

The use and advantages of this invention are not restricted to its use with any particular catalyst or family of polymerization catalysts. The invention is useful in any exothermic polymerization reaction employing any catalyst whether it is supported or unsupported and regardless of whether it is in the form of a pre-polymerized catalyst.

The process is particularly suitable for polymerizing olefins at a pressure of between 0.5 and 6 MPa and at a temperature of between 30° C. and 130° C. For example for LLDPE production the temperature is suitably in the range 80–90° C. and for HDPE the temperature is typically 85–105° C. depending on the activity of the catalyst used. It is important to ensure that the temperature within the fluidized bed be maintained at a level which is safely below the sintering temperature of the polymer product being produced.

The polymerization reaction may be carried out in the presence of a metallocene catalyst system or a catalyst system of the of the Ziegler-Natta type. Ziegler-Natta catalyst systems are solid catalyst systems comprised of a compound of a transition metal employed with a cocatalyst comprising an organic compound of a metal (i.e. an organometallic compound, for example an alkylaluminium compound or a haloalkyl aluminum compound such as diethylchloroaluminum). Such high-activity catalyst systems have been known for many years and are capable of producing large quantities of polymer in a relatively short time. They also make it possible to avoid a step of removing catalyst residues from the polymer. The most commonly used high-activity catalyst systems generally comprise a solid catalyst consisting essentially of atoms of transition metal associated with magnesium and halogen which may be supported on finely divided silica. It is also possible to use a high-activity catalyst consisting essentially of chromium oxide supported on a refractory oxide.

It is an advantage of the process according to the present invention that the improved cooling effect is particularly beneficial for polymerization processes using highly active catalysts, for example metallocene catalysts which may be supported on finely divided silica.

The catalyst may suitably be employed in the form of a prepolymer powder prepared beforehand during a prepolymerization stage with the aid of a catalyst as described above. The prepolymerization may be carried out by any suitable process, for example, polymerization in a liquid hydrocarbon diluent or in the gas phase using a batch process, a semi-continuous process or a continuous process.

The preferred process according to the present invention is one wherein substantially the whole of the recycle gas stream is cooled and separated and wherein substantially the whole of the separated liquid is employed for cooling the fluidized bed either indirectly through the reactor wall; by introduction with the gas stream entering below the fluidization grid; by direct introduction into the fluidized bed or by a combination of these methods of introduction.

In an alternative embodiment of the present invention the recycle gas stream is divided into a first stream and a second stream. The first stream is passed directly to the reactor in a conventional way by injection below the fluidization grid and the second stream is cooled and the stream separated into a gas and a liquid stream. The separated gas stream may be combined with the first stream and reintroduced into the reactor below the bed, for example, below the fluidization grid, if such a grid is employed. The separated liquid is introduced into the reactor, after passage in indirect heat exchange relation with the fluidized bed, according to the present invention.

The recycle gaseous stream is suitably cooled by means of one or more heat exchangers to a temperature such that liquid is condensed in the gas stream. Suitable heat exchangers are well known in the art.

The gas stream leaving the top of the reactor may entrain a quantity of catalyst and polymer particles and these may be removed, if desired, from the recycle gas stream by means of a cyclone separator. A small proportion of these particles or fines may remain entrained in the recycle gaseous stream and, after cooling and separating the liquid from the gas, the fines can, if desired, be reintroduced into the fluidized bed together with the separated liquid stream.

The recycle gas stream withdrawn from the reactor is comprised primarily of unreacted gaseous monomer and may also include inert hydrocarbons such as those used for the injection of catalyst, reaction activators or moderators into the reactor. The withdrawn recycle stream will also include inert condensible gases, such as isopentane, decane or the like when such inert materials are employed to facilitate reactor cooling according to the invention.

Make-up monomers, for example ethylene, to replace monomers converted into polymer by the polymerization reaction, may be added to the recycle gas stream at any suitable location. Condensable makeup monomers, for example, butene, hexene, 4-methylpentene and octene, when used as comonomers for the production of LLDPE, and inert condensable liquids, for example, pentane, isopentane, butane and hexane, if employed, may be introduced into the recycle stream as liquids or as gases.

Inert condensable liquids, for example, pentane may, for example, be injected into the recycle gaseous stream before the heat exchanger, between the heat exchanger and the separator or elsewhere such as into the separated gas stream prior to its entry into the reactor. The particular point of entry of such liquids is not important for the achievement of the benefits of this invention. The same is true with regard to the introduction of make-up monomer into the reactor or the cycle stream. For the preparation of LLDPE, for example, butene, the usual comonomer, is preferably injected into the recycle gaseous stream prior to its passage into the reactor or before passage into a heat exchanger used to cool the cycle gas stream.

Suitable means for separating the liquid are for example cyclone separators, large vessels which reduce the velocity of the gas stream to effect separation (knock-out drums), demister type gas liquid separators and liquid scrubbers, for example, venturi scrubbers. Such separators are well known in the art. The use of a demister type of gas-liquid separator is particularly advantageous in the process of the present invention.

The use of a cyclone separator in the recycle gas stream prior to the gas-liquid separator is optional in circumstances where large amounts of fines are carried out of recycle stream leaving the top of the reactor. A cyclone separator at this location will remove the majority of the fines from the gaseous stream leaving the reactor and can thereby facilitate the use of a downstream demister separator by reducing the possibility of fouling the separator.

A further advantage of using a demister type of separator is that the pressure drop within the separator can be lower than in other types of separators thereby enhancing the efficiency of the overall process.

A particularly suitable demister separator for use in the process of the present invention is a commercially available vertical gas separator known as a "Peerless" (Type DPV P8X). This type of separator uses the coalescence of liquid droplets on a vane arrangement to separate the liquid from the gas. A large liquid reservoir is provided in the bottom of the separator for collection of the liquid. The liquid reservoir enables the liquid to be stored thereby providing control over the discharge of the liquid from the separator. Under normal conditions this type of separator removes on the order of 80% to 85% of condensed liquid from the gas stream. If desired, a filter mesh, or other suitable means, may be arranged in the liquid reservoir of the separator to collect any fines present in the separated liquid.

After separation, all or a portion of the separated cold liquid is suitably brought into indirect heat exchange relationship with the fluidized bed through the exterior wall of the reactor. By this means it removes heat from the interior of the reactor, especially the reaction zone and by so doing becomes a heated fluid. Depending upon the amount of heating experienced by the cold liquid, this now heated fluid will be all gas, a mixture of gas and liquid or will remain entirely liquid, but at a somewhat warmer temperature. This heated fluid is then introduced into the reactor or elsewhere in the reaction system at whatever point is desired. It is preferably introduced into the reactor at a location below the gas distribution plate or fluidization grid. It may also be passed directly into the polymerization zone through a suitable arrangement of one or more nozzles, which may be gas atomized. The cold liquid can also simply be sprayed into the interior of the reactor. Ultrasonic nozzles may also be used for this purpose.

Techniques for introducing liquid directly into the fluidized bed are described in detail in the aforementioned U.S. Pat. No. 5,541,270 which is incorporated herein by reference. If desired, gaseous make-up monomer or a portion of the gaseous recycle stream leaving the separator may be used as an atomizing gas.

Depending upon the duration of time in which the cold liquid is in heat exchange contact with the wall of the reactor and the amount of heat generated in the polymerization zone, the liquid may be partially or totally vaporized. If the liquid is totally or partially vaporized at this point, it is preferred to pass the gaseous monomer stream into the lower regions of the reactor, preferably below the fluidization grid by direct passage of the stream into the reactor or by combining it with the gaseous monomer stream leaving the separator, prior to its entry into the reactor.

If the liquid is totally vaporized or nearly so, it may be combined with the cycle gas stream at any location up stream of a heat exchanger wherein condensation of a part of the cycle gas stream takes place.

When the liquid monomer stream remains entirely or nearly entirely in a liquid state after indirect heat exchange contact with the fluidized bed, the still cold liquid can be combined with the gas stream entering the bottom of the reactor or it may be injected directly into the polymerization zone of the reactor in the manner described above. Depending upon the extent to which the liquid monomer has been indirectly warmed, there may be sufficient monomer gas such that injection directly into the fluidized bed may be accomplished in the same manner as through the use of atomizing nozzles as described in the aforementioned U.S. Pat. No. 5,541,270.

All or a portion of the cold liquid may also be sprayed on top of the fluidized bed, which has the benefit of reducing the amount of fines carried out of the reactor in the exiting recycle gas stream. Some of the cooling effect of the liquid is lost when this method is employed, however the resultant cooling of the recycle stream leaving the reactor has the benefit of reducing the cooling load on the heat exchanger.

In still another alternative in the practice of this invention, some quantity of liquid condensate remaining after indirect heat exchange contact with the fluidized bed may be introduced into the upper regions of the reactor in such a way as to form a film of liquid on the interior wall of the reactor. This can be accomplished by nozzles directing a fine spray of liquid onto the interior surface of the reactor wall. Liquid may also be transferred directly onto the interior reactor wall by the use of an interior manifold or by introducing liquid onto the wall by passage through tangentially directed ports in the wall of the reactor. At least a part of liquid in the form of a film on the wall becomes vaporized by the heat of polymerization and because at least a part of the continuous flow of gas in a gas fluidized bed reactor travels down the interior wall of the reactor, some part of the liquid is entrained and carried in the gas stream until vaporized.

The apparatus for bringing the cold liquid leaving the separator into an indirect heat exchange relationship with the fluidized bed can be quite simple, as the advantages gained through the practice of this invention are not dependent upon the manner in which the cold liquid is brought into such indirect heat exchange relationship. However a preferred method for accomplishing this objective is to locate a first manifold at or near the top of the reactor and a second manifold near the bottom of the reactor. The cold liquid leaving the separator is passed, preferably into the upper manifold where it is distributed into a plurality of conduits or passages, preferably metal conduits, which have good heat transfer properties and which are aligned in close contact with the reactor wall. The conduits lead from the first manifold to the second manifold where the cold liquid and any monomer converted to gas is collected and distributed into the reactor in the manner described above. While, because of the height of present day commercial reactors, it is preferred that the conduits make a single pass directly between manifolds, a longer path or even a circumferential path may be used if desired. While in theory the manifolds and heat exchange conduits could be positioned inside the reactor and achieve the same result in thermodynamic terms, it is preferable to locate both manifolds and heat exchange conduit outside the reactor wall to avoid presenting possible sites for gas flow disruption and potential fouling of the interior of the reactor which is best kept as streamlined and smooth as possible to avoid such difficulties.

The cross-sectional shape of the heat exchange conduit preferably provides a substantially flat surface to maximize contact with the reactor wall to thereby maximize heat exchange efficiency. Because of very large height and diameter of such commercial reactors it preferred to provide modules of a plurality of heat exchange conduits to facilitate removal and replacement, if necessary. To avoid atmospheric heating of liquid passing through the heat exchange conduits it is also preferred to provide adequate insulation on the exposed surface of the heat exchange conduits and preferred heat exchange modules.

The practice of this invention does not require that the entire surface of the reactor be cooled. If desired, through the use of valves in appropriate locations, not all of any installed cooling conduits need to be used to carry the cold liquid at any one time. It is however preferred not to create significant variations in reactor wall temperature. It is also necessary that space be left in a number of locations on the reactor wall to facilitate the placement of instrumentation, an aperture for removal of product, apertures for the introduction of catalyst and the like.

A high degree of flexibility in the amount of heat that can be removed from the reactor is a major advantage of this invention. Those skilled in the art will recognize that a particular desired amount of heat removal can be achieved simply by appropriate adjustment of any one or more of the following factors:

1. The temperature of the liquid leaving the separator. (Note that the liquid can be cooled further by refrigeration after leaving the separator, if necessary.)
2. The amount and rate of flow of liquid through the conduits used to cool the reactor wall.
3. The amount of reactor wall surface in heat exchange contact with the cooling conduits.

By increasing the amount of liquid that can be employed for cooling the reactor, higher levels of production can be achieved due to the increased cooling capacity.

In accordance with the invention, gas from the separator is recycled to the fluidized bed, normally by introduction into the bottom of the reactor. If a fluidization grid is employed, such recycle is normally to the region below the grid, as the grid facilitates uniform distribution of the gas which serves to fluidize the bed. The use of a fluidization grid is preferred for this reason. Fluidization grids suitable for use in the process of the present invention can be of conventional design, for example, a flat or dished plate perforated by a plurality of holes distributed more or less uniformly across its surface. The holes may for example be of a diameter of about 5 mm.

The process of the present invention is operated with a gas velocity in the fluidized bed which must be greater than or equal to that required for fluidization of the bed. The minimum gas velocity is generally on the order of 6 cm/sec. The process of the present invention is preferably conducted using a gas velocity in the range 40 to 100 cm/sec, most preferably 50 to 70 cm/sec.

In the process according to the present invention the catalyst or prepolymer is preferably introduced directly into the fluidized bed. Alternatively, catalyst may be introduced directly into the bed using a portion of the separated liquid stream. This latter technique can lead to improved dispersion of the catalyst or prepolymer in the bed.

If desired, liquid or liquid-soluble additives, such as activators, cocatalysts and the like, can be introduced into the bed either directly or together with cold condensed liquid from the separator.

If, for example, the process of the present invention is employed to make ethylene homopolymer or ethylene copolymer, make-up ethylene to replace the ethylene consumed during the polymerization, may be advantageously introduced into the separated gas stream prior to its reintroduction into the bed (for example below the fluidization grid if such is employed). The separated liquid stream may be subjected to additional cooling (e.g. using refrigeration techniques) before being introduced into the heat exchange conduits or prior to introduction into the bed after exiting the second manifold. This allows an even greater cooling effect in the bed than is provided by the liquid evaporative effect alone (latent heat of evaporation), thereby providing a further potential increase in the productivity of the process. Cooling of the separated liquid stream may be achieved by use of suitable cooling means e.g. a simple heat exchanger or refrigerator located between the separator and the manifold or between the second manifold and the entry point into the reactor. A further advantage of this particular aspect of the present invention is that, cooling the liquid prior to its introduction into the fluidized bed, reduces the likelihood for polymerization to begin to take place due to the possible presence of catalyst or prepolymer in the liquid stream.

The liquid or mixture of liquid and gas may be introduced into the fluidized bed by suitably arranged injection means. A single injection means may be used or a plurality of injection means may be arranged within the fluidized bed.

A preferred arrangement is to provide a plurality of injection means substantially equally spaced in the fluidized bed in the region where the introduction of the liquid is desired. The number of injection means used is that number which is required to provide sufficient penetration and dispersion of liquid at each injection point to achieve good dispersion of liquid across the bed. A preferred number of injection means is four.

Each of the injection means may, if desired, be supplied with the separated liquid by means of a common conduit suitably arranged within the reactor. This can be provided, for example, by means of a conduit passing up through the center of the reactor.

The injection means are preferably arranged such that they protrude substantially vertically into the fluidized bed, but may be arranged such that they protrude from the walls of the reactor in a substantially horizontal direction.

The rate and amount of liquid to be introduced into the bed, whether directly or indirectly with the entering gas stream depends primarily on the degree of cooling desired in the bed, and this in turn depends on the desired rate of production from the bed. The rates of production obtainable from commercial fluidized bed polymerization processes for the polymerization of olefins depend, inter alia on the activity of the catalyst employed, rate of catalyst addition and on the kinetics of such catalysts. Thus for example, when catalysts having very high activity are employed, and high production rates are desired, the rate and amount of liquid addition will be high. Typical rates of liquid introduction may be, for example, in the range 0.3 to 4.9 cubic meters of liquid per cubic meter of bed material per hour, or even higher. For conventional Ziegler catalysts of the "superactive" type (i.e. those based on transition metal, magnesium halide and organometallic cocatalyst, the rate of liquid addition may be, for example, in the range 0.5 to 1.5 cubic meters of liquid per cubic meter of bed material per hour.

In the process of the present invention the weight ratio of liquid: total gas which may be introduced into the bed can be for example in the range 1:100 to 2:1, preferably in the range 5:100 to 85:100, most preferably in the range 6:100 to 25:100. By total gas is meant the gas which is returned to the reactor to fluidize the bed together with any gas used to assist in the operation of the injection means, e.g. atomizing gas. However the total liquid in respect of these ratio determinations does not include any quantity of liquid which becomes vaporized by the transfer of heat through the reactor wall during passage through the heat exchange conduits. The ability to employ this significantly greater amount of cold liquid to remove heat from the fluidized bed is a principal advantage of this invention.

Any suitable injection means may be used to disperse liquid into the bed provided the penetration and dispersion of the liquid into the bed from such means is sufficient to achieve a good and essentially uniform dispersion of liquid across the bed.

The preferred injection means for introducing liquid directly into the bed is a nozzle or a plurality of nozzles, which includes gas-induced atomizing nozzles in which a gas is used to assist in the injection of the liquid, as well as liquid-only spray type nozzles.

It is important in the process of the present invention to achieve good dispersion and penetration of the liquid into the bed. Factors which are important in achieving good penetration and dispersion are the momentum and direction of the liquid entering the bed, the number of points of introduction of the liquid per unit cross-sectional area of the bed, and the spatial arrangement of the points of introduction of the liquid. When liquid enters the bed with entering gas from below the fluidization grid, the grid serves promote good distribution of liquid in the stream.

Suitable nozzles, their arrangement and appropriate conditions for the introduction of liquid or gas/liquid mixtures into the fluidized bed from a direction other than from below the fluidization grid are described in U.S. Pat. No. 5,541,270.

As indicated above, the jets of liquid introduced into the fluidized bed may consist solely of liquid or may comprise a liquid-gas mixture. Such gas may be merely carried in the liquid, or may be employed to atomize the liquid, or to provide motive force to propel the liquid.

Before commencing the introduction of liquid by use of the process according to the present invention, the gas phase fluidized bed polymerization may be started in a conventional manner for example by charging the bed with particulate polymer particles and then initiating the gas flow through the bed.

Processes according to the present invention will now be illustrated with reference to the accompanying drawings.

FIGS. 1–4 diagrammatically show processes according to this invention.

Figure 1:
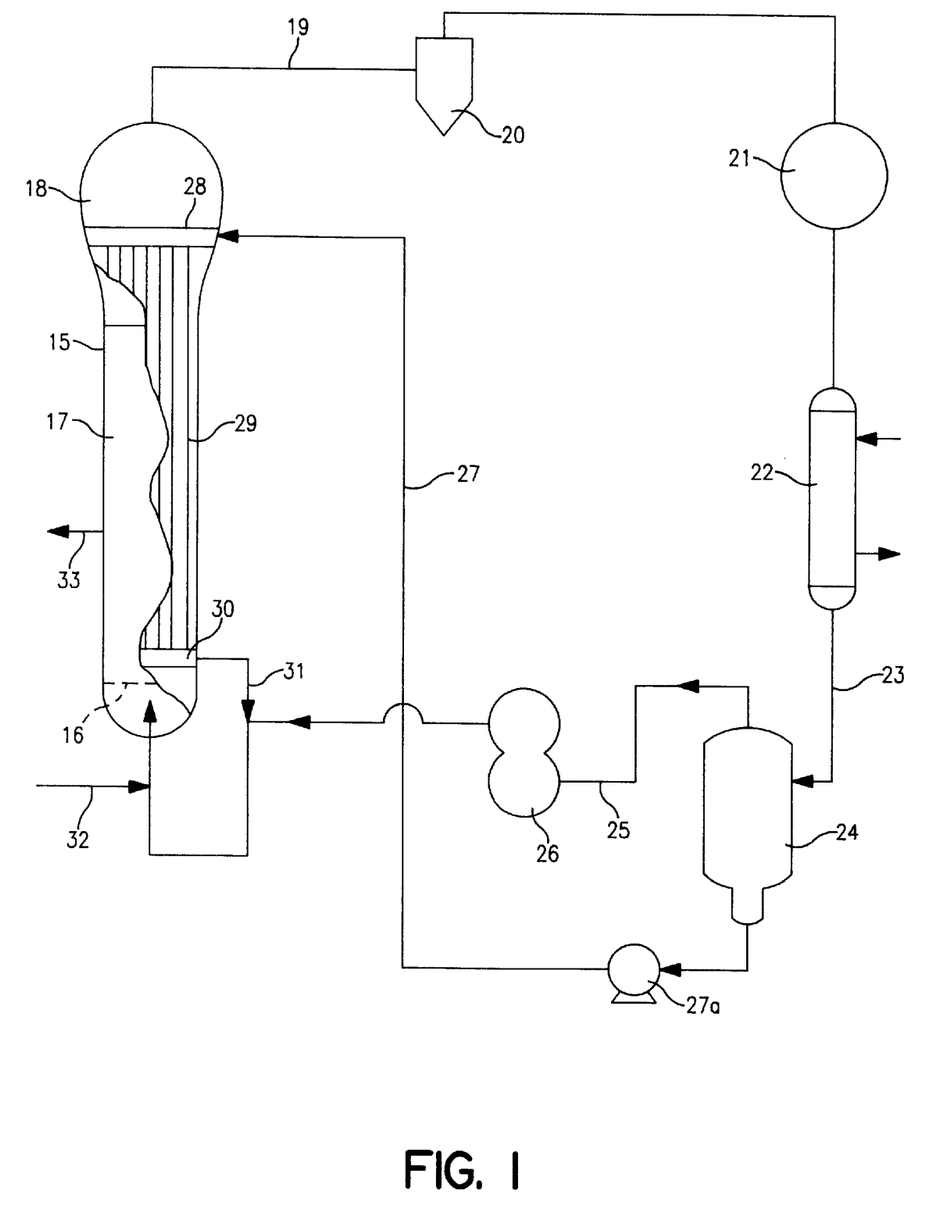
FIG. 1 shows, diagrammatically, a gas-phase fluidized bed polymerization process according to the invention.

FIG. 1 illustrates a gas-phase fluidized bed reactor consisting essentially of a reactor body 15 which is generally an upright cylinder having a fluidization grid 16 located in its lower regions. The reactor body encloses a fluidized bed 17 and a velocity reduction zone 18 which is generally of increased diameter compared to the diameter of the fluidized bed portion of the reactor.

The gaseous reaction mixture leaving the top of the fluidized bed reactor is the recycle gas stream which is primarily comprised of unreacted monomer. The recycle gas stream may also include inert condensable gases such as isopentane, as well as inert non-condensable gases such as nitrogen. The recycle stream is transferred via line 19 to compressor 21 and from compressor 21 to heat exchanger 22. An optional cyclone separator 20 may be employed, as shown, preferably upstream of compressor 21, to remove fines, if necessary. An additional heat exchanger (not shown) may also be employed if desired, preferably upstream of compressor 21.

After compressing and cooling at least a portion of the recycle gas stream to a temperature at or below the temperature where liquid condensate begins to form (the dew point), all or a portion of the resultant gas liquid mixture is transferred via line 23 to separator 24 where all or a portion of the liquid is removed. All or a portion of the gas stream, which may contain some liquid, is transferred via line 25 to a point below the fluidization grid 16 in the lower region of the reactor. An amount of upwardly flowing gas, sufficient to maintain the bed in a fluidized condition, is provided in this way.

Those skilled in the art will understand that less gas is required to maintain fluidization when the reactor employed is a stirred bed reactor.

An optional compressor 26 may be provided to ensure that a sufficient velocity is imparted to the gases flowing through line 25 into the bottom of the reactor, preferably below grid 16 as shown in the drawing. The gas stream entering the bottom of the reactor may contain condensed liquid, if desired.

All or a portion of the liquid monomer separated from the recycle stream in separator 24 is transferred via line 27 to a manifold 28 located at or near the top of the reactor. If desired, a pump 27a may be provided in line 27 to facilitate the transfer of liquid to manifold 28. The liquid entering manifold 28 flows downward into manifold 30 through a plurality of conduits 29 which have good heat exchange properties and which are in heat exchange contact with the wall of the reactor. The passage of liquid monomer through the conduits 29 cools the interior wall of the reactor and warms the liquid to a greater or lesser extent depending upon the temperature differential and the duration and extent of heat exchange contact. Thus by the time the liquid entering manifold 28 reaches manifold 30, it has become a heated fluid which may have remained in an entirely liquid state or it may have become partially or totally vaporized.

As shown in FIG. 1, the heated fluid (gas and/or liquid) is passed from manifold 30 via line 31 to combine with gases leaving the separator 24 via line 25, prior to entry into the reactor in the region below the fluidization grid 16. In like manner, make-up monomer can be introduced into the reactor in either liquid or gaseous form via line 32. Gas and/or liquid collected in manifold 30 may also be transferred directly into the reactor (not shown) in the region below the fluidization grid.

Product polymer particles can be removed from the reactor via line 33 in the conventional way, as for example by the method and apparatus described in U.S. Pat. No. 4,621,952.

Catalyst or prepolymer catalyst is continuously or intermittently injected into the reactor using a catalyst feeder (not shown) such as the device disclosed in U.S. Pat. No. 3,779,712. The catalyst is preferably fed into the reactor at a point 20 to 40 percent of the reactor diameter away from the reactor wall and at a height of about 5 to about 30 percent of the height of the bed.

A gas which is inert to the catalyst, such as nitrogen or argon is preferably used to carry catalyst into the bed. Cold condensed liquid from either separator 24 or from manifold 30 may also be used to transport catalyst into the bed.

Figure 2:
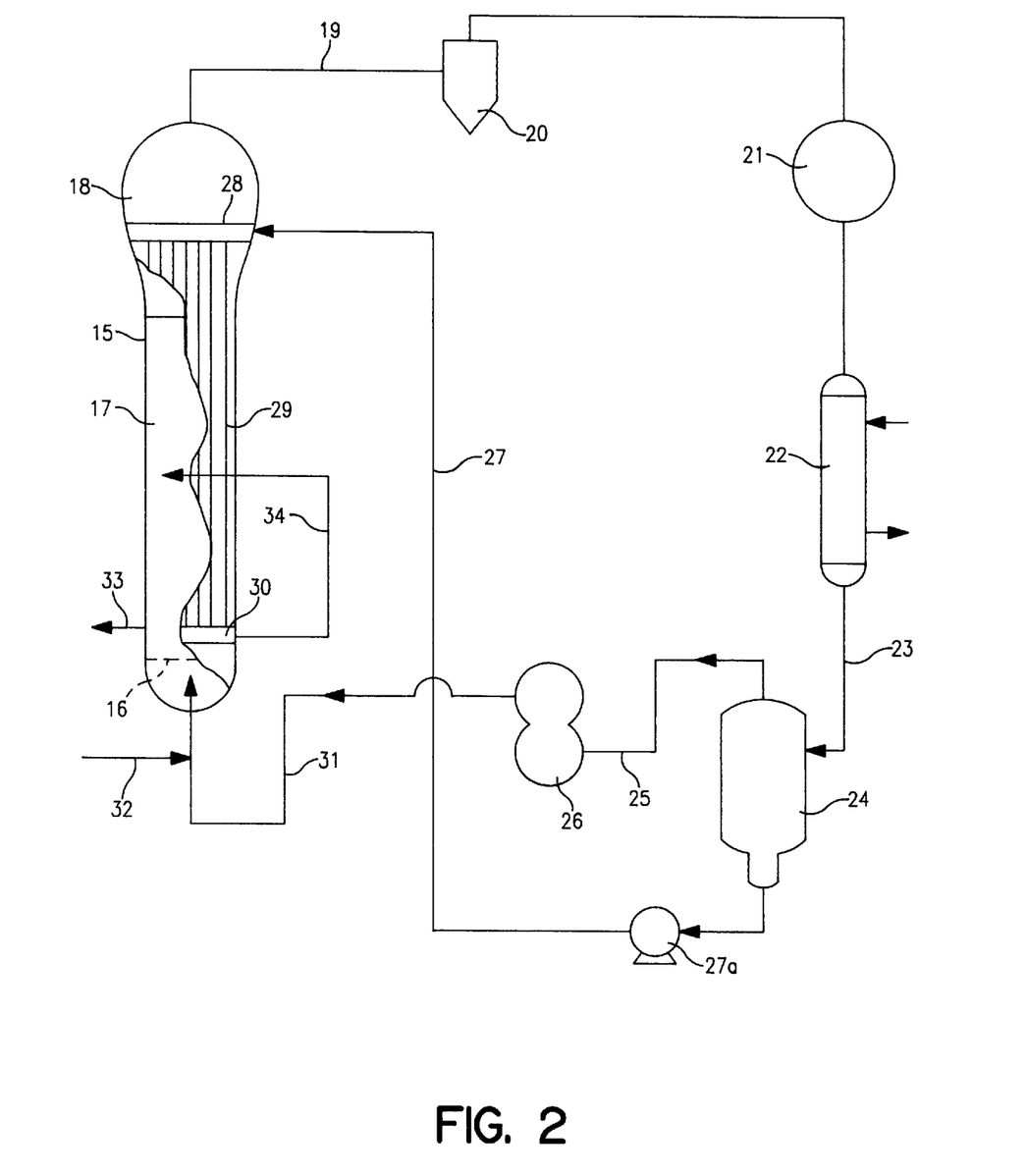
FIG. 2 shows, diagrammatically, an alternative arrangement for the practice of the invention.

FIG. 2 illustrates an alternative arrangement for conducting the process of this invention in which heated fluid collected in manifold 30 is introduced directly into the fluidized bed via line 34. One or more nozzles, (not shown) such as those described above and in U.S. Pat. No. 5,541,270 may be employed in the interior of the reactor to facilitate good dispersion.

Figure 3:
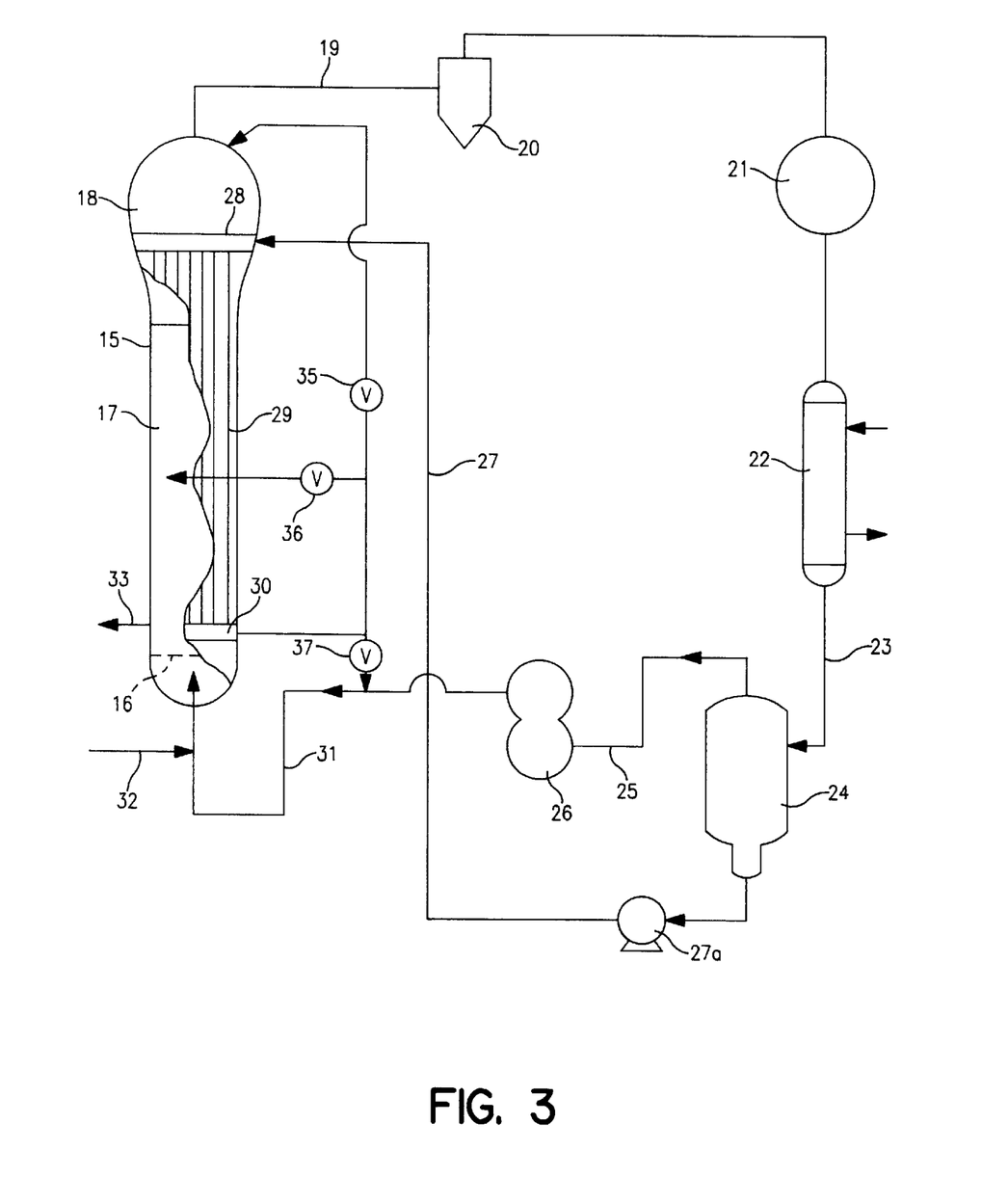
FIG. 3 shows still another alternative arrangement for the practice of the invention.

FIG. 3 illustrates still another embodiment of the invention in which monomer separated in separator 24 and collected in manifold 30 can, by appropriate operation of valves 35, 36 and 37, be passed selectively into the region below the fluidization grid 16; directly into the fluidized bed 17 or be sprayed on top of the fluidized bed in whatever combination is desired.

Figure 4:
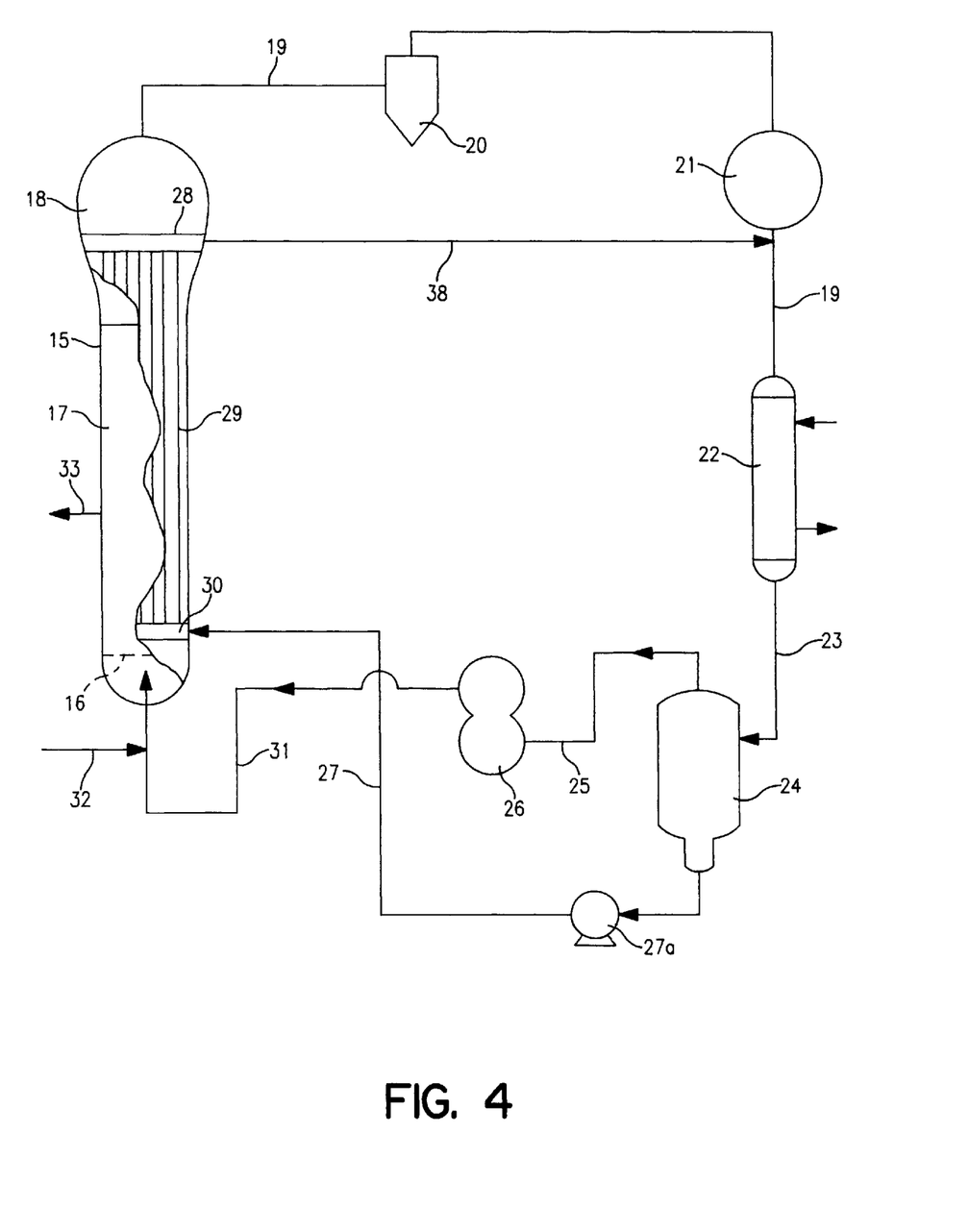
FIG. 4 shows still another alternative arrangement for the practice of the invention.

FIG. 4 illustrates still another alternative embodiment of the invention in which cold liquid from separator 24 is transferred via line 27 to manifold 30 at the bottom of the reactor. The cold liquid flows upwardly through conduits 29. The resultant heated fluid is collected in manifold 28 at the top of the reactor and is then transferred via line 38 to combine with the cycle gas stream passing from the reactor via line 19 into heat exchanger 22. This embodiment is particularly useful in circumstances where it is desirable to conduct the process in a manner such that no liquid enters the fluidized bed of the reactor.

To conduct the process in such a dry manner, essentially all liquid is separated from the gas stream entering separator 24 and transferred via line 27 to manifold 30 as described above. The residual cold dry gas is transferred from the separator via lines 25 and 31 into the bottom of the reactor. The liquid passing from manifold 30 into conduits 29 is maintained in indirect contact with the fluidized bed for a period of time sufficient to vaporize essentially all of the cold liquid. When the process is conducted in this manner, an increase in the space time yield of the process is obtained without the introduction of liquid into the fluidized bed. This is the result of the non-condensed gases being cooled to a temperature, which can be significantly below the dew point temperature of the cycle gas stream entering the heat exchanger. When conducting the process in accordance with this embodiment, it is preferred to pass the cold liquid upwardly from manifold 30 through conduits 29 to manifold 28, as shown. Operation of the process in this manner is preferred because under these conditions, the heated fluid resulting from the indirect cooling of the fluidized bed leaves contact with the reactor at a point near the top of the reactor where the internal temperature of the reactor is higher in comparison to the region at the bottom of the reactor which is relatively cold as a result of the cold gases entering via line 31. In this way condensation is avoided that might otherwise occur due to cooling of the heated fluid resulting from indirect heat exchange with the cooler region of the bed existing at the bottom of the bed.

The process of the present invention provides substantial improvements in the productivity of gas fluidized bed polymerization processes over existing processes. The process of the present invention can be employed in a new plant or can be employed in existing plant to obtain substantial increases in productivity and better control of liquid addition to the bed. In the case of the installation of new plant, substantial reductions in capital costs can be achieved by using smaller reaction vessels, compressors and other ancillary equipment than would otherwise have been necessary to achieve a particular level of productivity. In the case of an existing plant, modification of the facility in accordance with the present invention provides a substantial increase in productivity and improved control of the process.

We claim:

1. A continuous process for the polymerization of a polymerizable olefin monomer or a mixture of two or more olefinic monomers which comprises passing a gaseous stream comprised of an olefin monomer or a mixture of olefinic monomers through a fluidized bed in a reactor in the presence of a polymerization catalyst under reactive conditions, to polymerize at least a portion of said olefin monomer or said mixture of olefinic monomers, which comprises:

A. withdrawing a gaseous stream from said reactor which is comprised of at least some unreacted olefin monomer or at least some of said mixture of olefinic monomers,
   B. cooling at least a part of said gaseous stream withdrawn from said reactor to a temperature at or below that at which liquid condenses out of said stream,
   C. separating at least part of the condensed liquid from the cooled gaseous stream,
   D. continuously introducing at least a portion of said cooled gaseous stream into the said reactor,
   E. bringing at least a part of said condensed liquid into indirect heat exchange relationship with said fluidized bed, thereby to produce a heated fluid.

2. A continuous process for the polymerization of a polymerizable olefin monomer or a mixture of two or more olefinic monomers which comprises: passing a gaseous stream comprised of an olefin monomer or a mixture of olefinic monomers through a fluidized bed in a reactor in the presence of a polymerization catalyst, under reactive conditions, to polymerize at least a portion of said olefin monomer or said mixture of olefinic monomers, which comprises:

A. withdrawing a gaseous stream from said reactor which is comprised of at least some unreacted olefin monomer or at least some of said mixture of olefinic monomers,
   B. cooling at least a part of said gaseous stream withdrawn from said reactor to a temperature at or below that at which liquid condenses out of said stream,
   C. separating at least part of the condensed liquid from the cooled gaseous stream,
   D. continuously introducing at least a portion of said cooled gaseous stream into said reactor
   E. bringing at least a part of said condensed liquid into indirect heat exchange relationship with said fluidized bed, thereby to produce a heated fluid, F. and thereafter:
  a) if said heated fluid is essentially all liquid, then introducing the liquid:
    i) directly into the fluidized bed, or
    ii) into the reactor in the region below the fluidized bed, or
    iii) into the said cooled gaseous stream prior to its entry into the reactor, or
    iv) by spraying the liquid on top of the fluidized bed or,
    v) introducing said liquid into any one or more of these locations by any manner of introduction; or
  b) if said heated fluid is entirely gaseous or is a mixture of gas and liquid, then introducing said gas or said mixture of gas and liquid, partly or entirely:
    i) into the region of the reactor below the fluidized bed or,
    ii) into the said cooled gaseous stream prior to its entry into the reactor or,
    iii) directly into the fluidized bed or,
    iv) into the said gaseous stream withdrawn from said reactor, at a location prior to the entry of said gaseous stream into a heat exchanger for the cooling thereof, or
    v) into any one or more of these locations by any manner of introduction.

3. A continuous process according to claim 1 wherein said reactor is a gas fluidized bed reactor.

4. A continuous process according to claim 1 wherein said reactor is a stirred bed reactor.

5. A continuous process according to claim 1 wherein said gaseous stream includes an inert condensable gas.

6. A continuous process according to claim 1 wherein said gaseous stream is comprised of ethylene or ethylene and one or more other polymerizable monomers.

7. A continuous process according to claim 1 wherein said gaseous stream is comprised of propylene and one or more other polymerizable monomers.

8. A continuous process according to claim 1 wherein said heated fluid, is essentially all liquid and is introduced directly into said fluidized bed.

9. A continuous process according to claim 1 wherein said heated fluid, is essentially all liquid and is introduced into the reactor in the region below the fluidized bed.

10. A continuous process according to claim 1 wherein said heated fluid, is essentially all liquid and is combined with the said cooled gaseous stream prior to its entry into the reactor.

11. A continuous process according to claim 1 wherein said heated fluid, is essentially all liquid and is sprayed on top of the fluidized bed.

12. A continuous process according to claim 1 wherein said heated fluid, is essentially all liquid and is introduced into the reactor in the region below the fluidized bed or is combined with the said cooled gas stream or is sprayed on top of the fluidized bed or is passed into one or more of the said locations by any manner.

13. A continuous process according to claim 1 wherein said heated fluid, is essentially all gas and is introduced:
  i) into the region of the reactor below the fluidized bed or,
  ii) into the said cooled gaseous stream prior to its entry into the reactor or,
  iii) into the said gaseous stream withdrawn from said reactor, at a location prior to its entry into a heat exchanger to the final cooling thereof, or
  iv) into any one or more of these locations by any manner of introduction.

14. A continuous process according to claim 1 wherein said heated fluid, is essentially all liquid, and is introduced:
  i) into the region of the reactor below the fluidized bed or,
  ii) into the said cooled gaseous stream prior to its entry into the reactor or,
  iii) directly into the fluidized bed or,
  iv) into any one or more of these locations by any manner of introduction.

15. A continuous process according to claim 1 wherein pump means is provided to assist the passage of said condensed liquid in heat exchange relation to said reactor wall.

16. A continuous process according to claim 1 wherein said condensed liquid is cooled further after being separated from said cooled gaseous stream.

17. A continuous process according to claim 1 wherein said condensed liquid is divided into at least two separate streams, one of which is introduced directly into said fluidized bed and one other stream is combined with said cooled gaseous stream or sprayed on top of said bed.

18. A process for producing polymer from monomer by an exothermic polymerization reaction in a reaction zone containing a bed of gas fluidized growing polymer particles which comprises:
  A. continuously passing a gaseous stream comprising monomer through said reaction zone with an upward velocity sufficient to maintain said particles in a suspended and gas fluidized condition;
  B. intermittently or continuously introducing a polymerization catalyst into said reaction zone;
  C. continuously or intermittently withdrawing polymer product from said reaction zone;
  D. continuously withdrawing a stream comprising unreacted monomer gases from said reaction zone;
  E. compressing and cooling said stream to a temperature below the dew point of said stream to form a mixture comprised of gas and liquid;
  F. separating liquid from said mixture;
  G. continuously introducing all or a part of the remainder of said mixture, after separation of liquid from said mixture, into the bottom of said reactor in a region below the said reaction zone; and
  H. bringing at least a part of said separated liquid into indirect heat exchange relation with said reaction zone, thereby to produce a heated fluid.

19. A process for producing polymer from monomer by an exothermic polymerization reaction in a reaction zone containing a bed of gas fluidized growing polymer particles which comprises:
  A. continuously passing a gaseous stream comprising monomer through said reaction zone with an upward velocity sufficient to maintain said particles in a suspended and gas fluidized condition;
  B. intermittently or continuously introducing polymerization catalyst into said reaction zone;
  C. continuously or intermittently withdrawing polymer product from said reaction zone;
  D. continuously withdrawing a stream comprising unreacted gases from said reaction zone;
  E. compressing and cooling said stream to a temperature below the dew point of said stream to form a mixture comprised of cooled gas and cooled liquid;
  F. separating cooled liquid from said mixture;
  G. continuously introducing all or a part of the remainder of said mixture, after separation of cooled liquid therefrom, into the bottom of said reactor in a region below the said reaction zone;

H. bringing at least a part of said cooled liquid into indirect heat exchange relation with said reaction zone, thereby to produce a heated fluid and causing all or a part of said heated fluid:
  i) to pass directly into said fluidized bed; or
  ii) to pass into the bottom of the reactor in a region below the said reaction zone; or
  iii) to combine with the said remainder of said mixture for passage into the bottom of said reactor; or
  iv) to be sprayed on top of said bed.

20. A process according to claim 18 wherein said catalyst is a metallocene catalyst.

21. A process according to claim 18 wherein said catalyst is a transition metal containing catalyst.

22. A process according to claim 18 wherein said catalyst is a transition metal containing catalyst or a metallocene catalyst supported on finely divided silica.

23. A process according to claim 18 wherein said catalyst is a catalyst which has been prepolymerized.

24. A process according to claim 18 wherein said monomer is ethylene alone or ethylene in combination with one or more other olefinic monomers.

25. A process according to claim 18 wherein said monomer is propylene alone or propylene in combination with one or more other olefinic monomers.

26. A process according to claim 18 wherein said monomer is comprised of one or more olefinic monomers in combination with a condensable inert gas.

27. A process according to claim 18 wherein said separated liquid is brought into indirect heat exchange relation with said reaction zone by passage through a plurality of conduits passing from an upper region of said reactor to a lower region of said reactor.

28. A process according to claim 27 wherein said upper region of said reactor is a location which is above the level of said fluidized bed.

29. A process according to claim 18 wherein said separated liquid is brought into indirect heat exchange relation with said reaction zone by passage through a plurality of conduits passing from a lower region of said reactor to an upper region of said reactor.

30. A process according to claim 18 wherein all or a part of said heated fluid is introduced directly into said fluidized bed.

31. A process according to claim 18 wherein all or a part of said heated fluid is introduced into the reactor in the region below the fluidized bed.

32. A process according to claim 18 wherein all or a part of said heated fluid is combined with said cooled gaseous stream prior to the entry of said cooled gaseous stream into the reactor.

33. A process according to claim 18 wherein all or a part of said heated fluid is sprayed onto the top of said fluidized bed.

34. A process according to claim 18 wherein all or a part of said heated fluid is combined with said gaseous stream prior to the passage of said gaseous stream through a heat exchanger for the cooling thereof.

35. A process according to claim 30 wherein all or a part of said heated fluid is introduced into the said fluidized bed through nozzle means.

36. A process according to claim 35 wherein said nozzle means is one or more spray nozzles, gas assisted spray nozzles or ultrasonic nozzles.

37. Apparatus for the continuous, gas phase exothermic polymerization of one or more monomers, comprising:
  A. a reactor vessel defining a reaction zone for containing a fluidized bed of particulate polymer and for the passage of a fluidizing gas therethrough, which fluidizing gas comprises at least one condensable fluid;
  B. in fluid communication with said reactor vessel, at least one heat exchanger for cooling gas removed from said vessel, and adapted to provide a cold fluid containing a gas phase and a condensed liquid phase;
  C. in fluid communication with at least one cooling heat exchanger, at least one separator adapted to divide said cold fluid into at least two streams, one of which is a substantially liquid phase stream and at least one other of which is a remaining fluid phase stream, comprising essentially all gas or a mixture of gas and liquid, said separator having at least one liquid phase stream outlet and at least one remaining fluid phase stream outlet;
  D. in fluid communication with at least one of said liquid phase stream outlets, at least one reaction heat exchanger adapted for indirect heat exchange with the said reaction zone to remove heat from said reaction zone and thereby to convert said liquid phase stream into a heated fluid;
  E. at least one conduit in fluid communication with said reaction heat exchanger adapted to introduce heated fluid into said reactor vessel or directly or indirectly into at least one cooling heat exchanger; and
  F. at least one conduit in fluid communication with at least one remaining fluid phase stream outlet of said separator adapted to introduce a remaining fluid phase stream into said reactor vessel.

38. Apparatus in accordance with claim 37 wherein said heated fluid is introduced directly into the said fluidized bed of said reactor.

39. Apparatus in accordance with claim 37 wherein said heated fluid is introduced into the said reactor at a location beneath said fluidized bed.

40. Apparatus in accordance with claim 37 wherein said heated fluid is introduced into said reactor by spraying said fluid onto the top of said fluidized bed.

41. Apparatus in accordance with claim 37 wherein a mechanical stirrer device is provided within said reactor to assist in the fluidization of said fluidized bed.

42. Apparatus in accordance with claim 37 wherein a compressor is provided to assist the transfer and introduction of said remaining fluid phase stream into said reactor vessel.

43. Apparatus for the continuous polymerization of one or more monomers which comprises:
  A. a gas fluidized bed or stirred bed reactor having a generally cylindrical configuration encompassing a reaction zone wherein monomer is polymerized;
  B. an expanded section at the top of said reactor located above the said reaction zone;
  C. an optional fluidization grid positioned in the lower region of said reactor and below the said reaction zone;
  D. an injector for continuously or intermittently introducing catalyst into the said reaction zone;
  E. one or more valved conduits in communication with the lower region of said reaction zone for continuously or intermittently removing polymer product therefrom;
  F. a gas outlet at or near the top of said reactor for continuously removing gases comprising unreacted monomer from said reactor;
  G. one or more heat exchanger means in fluid communication with said gas outlet, capable of lowering the temperature of said gases to or below the temperature where condensation of a portion of said gases results, thereby to produce a two phase mixture of gas and liquid;
  H. a separation device in fluid communication with said heat exchanger capable of separating part or all of said liquid from said two phase mixture;

I. an indirect heat exchanger in fluid communication with said separator for bringing said liquid into indirect heat exchange relation with said reaction zone thereby, to produce a heated fluid;

J. one or more injectors in fluid communication with said indirect heat exchanger for introducing said heated fluid:
   i) directly into said reaction zone; or
   ii) directly or indirectly into the bottom of said reactor in a region below the said reaction zone; or
   iii) in a manner so as to be sprayed on top of said reaction zone;

K. conduit means for introducing all or a part of the gas or mixture of gas and liquid remaining after separation of liquid into the bottom of the reactor in a region below the said reaction zone;

L. one or more compressors for pressurizing and cycling gaseous fluids removed from said reactor back to the said reactor at a velocity at least sufficient to maintain a bed located within said reaction zone in a fluidized condition.

\* \* \* \* \*